(12) United States Patent
Shiohara

(10) Patent No.: US 11,032,474 B2
(45) Date of Patent: *Jun. 8, 2021

(54) IMAGE-DISPLAYING DEVICE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,521

(22) Filed: Dec. 23, 2019

(65) Prior Publication Data
US 2020/0128182 A1 Apr. 23, 2020

Related U.S. Application Data

(63) Continuation of application No. 15/892,509, filed on Feb. 9, 2018, now Pat. No. 10,554,889, which is a
(Continued)

(30) Foreign Application Priority Data

Nov. 6, 2012 (JP) ................. 2012-244183

(51) Int. Cl.
H04N 5/232 (2006.01)
H04N 5/235 (2006.01)
(Continued)

(52) U.S. Cl.
CPC ....... H04N 5/23245 (2013.01); H04N 5/2352 (2013.01); H04N 5/2353 (2013.01);
(Continued)

(58) Field of Classification Search
CPC .. H04N 5/23245; H04N 5/2352; H04N 5/353; H04N 5/23293; H04N 5/243; H04N 5/2353; H04N 5/238
See application file for complete search history.

(56) References Cited

U.S. PATENT DOCUMENTS 6,567,925 B1 * 5/2003 Kimura .................. G09G 5/005
713/400
8,860,864 B2 * 10/2014 Shiohara .............. H04N 5/2352
348/333.01
(Continued)

FOREIGN PATENT DOCUMENTS

JP 2000-092380 A 3/2000
JP 2004-274284 A 9/2004
(Continued)

Primary Examiner — Nhan T Tran
(74) Attorney, Agent, or Firm — Global IP Counselors, LLP

(57) ABSTRACT

An image capturing device includes an image capturing unit capturing an image at a timing based on a first frame rate and outputs data corresponding to the image after a first period, an image data generation unit generating image data based on the output data and outputting the image data after a second period, a display unit displaying a display image based on the image data after the second period and at a timing based on a second frame rate, and a mode selecting unit selecting a first or second mode. The first mode prioritizes reduction in a display delay time. The second mode prioritizes image quality of the display image over reduction in the display delay time. A total period of the first and second periods is less than or equal to a first vertical synchronization period based on the first frame rate when the first mode is selected.

13 Claims, 8 Drawing Sheets

Related U.S. Application Data continuation of application No. 15/459,196, filed on Mar. 15, 2017, now Pat. No. 9,924,095, which is a continuation of application No. 15/259,615, filed on Sep. 8, 2016, now Pat. No. 9,609,216, which is a continuation of application No. 14/966,729, filed on Dec. 11, 2015, now Pat. No. 9,451,186, which is a continuation of application No. 14/511,335, filed on Oct. 10, 2014, now Pat. No. 9,241,108, which is a continuation of application No. 13/683,628, filed on Nov. 21, 2012, now Pat. No. 8,860,864.

(51) Int. Cl.
  *H04N 5/243* (2006.01)
  *H04N 5/353* (2011.01)
  *H04N 5/238* (2006.01)

(52) U.S. Cl.
  CPC ......... *H04N 5/23293* (2013.01); *H04N 5/243* (2013.01); *H04N 5/353* (2013.01); *H04N 5/238* (2013.01)

(56) References Cited

U.S. PATENT DOCUMENTS

| | | | |
|---|---|---|---|
| 9,241,108 B2 | 1/2016 | Shiohara | |
| 9,609,216 B2 * | 3/2017 | Shiohara | H04N 5/353 |
| 9,924,095 B2 | 3/2018 | Shiohara | |
| 2007/0195192 A1 * | 8/2007 | Miyanari | H04N 5/23241 348/370 |
| 2008/0079814 A1 * | 4/2008 | Nobuoka | H04N 5/23248 348/208.99 |
| 2009/0109316 A1 | 4/2009 | Matsui | |
| 2009/0207278 A1 * | 8/2009 | Muraki | H04N 5/772 348/231.99 |
| 2011/0285694 A1 | 11/2011 | Shiohara | |
| 2011/0285734 A1 | 11/2011 | Shiohara | |
| 2011/0285894 A1 | 11/2011 | Shiohara et al. | |
| 2011/0292236 A1 | 12/2011 | Shiohara | |
| 2011/0298962 A1 * | 12/2011 | Shiohara | H04N 5/23235 348/333.02 |
| 2011/0310268 A1 | 12/2011 | Shiohara | |
| 2011/0310269 A1 | 12/2011 | Shiohara | |
| 2012/0092542 A1 | 4/2012 | Kitano et al. | |
| 2012/0320231 A1 * | 12/2012 | Suito | H04N 5/23245 348/222.1 |
| 2013/0314546 A1 * | 11/2013 | De Groot | H04N 13/296 348/164 |
| 2014/0139740 A1 | 5/2014 | Ohba et al. | |

FOREIGN PATENT DOCUMENTS

| | | |
|---|---|---|
| JP | 2007-295096 A | 11/2007 |
| JP | 2007-295401 A | 11/2007 |
| JP | 2010-192991 A | 9/2010 |
| JP | 2009-111844 A | 5/2011 |

* cited by examiner

IMAGE-DISPLAYING DEVICE

CROSS-REFERENCE TO RELATED APPLICATIONS

This is a continuation application of U.S. patent application Ser. No. 15/892,509 filed on Feb. 9, 2018, which is a continuation application of U.S. patent application Ser. No. 15/459,196 filed on Mar. 15, 2017, now U.S. Pat. No. 9,924,095, which is a continuation of U.S. patent application Ser. No. 15/259,615 filed on Sep. 8, 2016, now U.S. Pat. No. 9,609,216, which is a continuation application of U.S. patent application Ser. No. 14/966,729 filed on Dec. 11, 2015, now U.S. Pat. No. 9,451,186, which is a continuation application of U.S. patent application Ser. No. 14/511,335 filed on Oct. 10, 2014, now U.S. Pat. No. 9,241,108, which is a continuation application of U.S. patent application Ser. No. 13/683,628 filed on Nov. 21, 2012, now U.S. Pat. No. 8,860,864. This application claims priority to Japanese Patent Application No. 2012-244183 filed on Nov. 6, 2012. The entire disclosure of Japanese Patent Application No. 2012-244183 is hereby incorporated herein by reference.

BACKGROUND

Technical Field

The present invention relates to an image capturing device and a method for controlling an image capturing device, and particularly relates to a technique for reducing display delay time in a live view.

Related Art

Conventionally, as disclosed in Japanese Laid-open Patent Publication No. 2007-295401 or Japanese Laid-open Patent Publication No. 2000-92380, an image capturing device has been known in which an image captured by an image capturing sensor is displayed as a live view on a display section such as a liquid crystal display.

SUMMARY

In an image capturing device in which a live view is displayed, it is known that there is a delay in displaying an image of an object with respect to the object. The display delay time can be defined as time required for displaying image data that shows an image of the object on a display section after an image capturing sensor receives light that shows the image of the object and stores it as a charge. In this definition, the display delay time includes charge storing time and processing time required for generating image data for a display and displaying it based on an output of the image capturing sensor. Since the charge storing time is generally determined by AE processing corresponding to the image capturing environment, it has been considered that the display delay time can be reduced by reducing the processing time. Also, in order to further reduce the display delay time, it is considered that the charge storing time should be reduced.

Japanese Laid-open Patent Publication No. 2007-295401 disclosed in paragraphs 0094-0097 that the frame rate is determined corresponding to the image capturing environment after the gain of the sensor and the diaphragm are set, and the charge storing time may be set optionally as long as it is shorter than time corresponding to the frame rate (a vertical synchronization period). Also, Japanese Laid-open Patent Publication No. 2000-92380 (FIG. 2) disclosed that the charge storing time is made as long as possible (a maximum amount of time to such an extent not to cause dropped frames, paragraph 0003) in a live view display, and the gain of the sensor is increased if it is still dark. This document also disclosed that, in capturing an image for the record, the charge storing time in which the gain is restored is determined in a case where the gain has been increased (the charge storing time in which the gain is restored is longer than that of the case where the gain is increased), and image capturing is conducted with the charge storing time in which the gain is restored. Accordingly, it has been conventionally known that the charge storing time may eventually become shorter than the vertical synchronization period in a live view display. However, it is not that the charge storing time is determined so as to intentionally reduce the display delay time. Therefore, when the charge storing time that achieves an appropriate exposure by AE processing has the same length as the vertical synchronization period, for example, the charge storing time is not shorter than the vertical synchronization period plus the processing time.

The present invention has been made to address the above-described circumstances, and an object of the present invention is to reduce the display delay time in a live view display.

An image capturing device according to one aspect includes an image capturing unit, an image data generation unit, a display unit, and a mode selecting unit. The image capturing unit captures an image at a timing based on a first frame rate of the image capturing unit and outputs output data corresponding to the image after a first period. The image data generation unit generates image data based on the output data and outputs the image data after a second period after the first period. The display unit displays a display image based on the image data after the second period and at a timing based on a second frame rate of the display unit. The mode selecting unit selects a first mode or a second mode. The first mode prioritizes reduction in a display delay time of the display image. The second mode prioritizes image quality of the display image over the reduction in the display delay time. A total period of the first period and the second period is less than or equal to a first vertical synchronization period based on the first frame rate when the first mode is selected.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
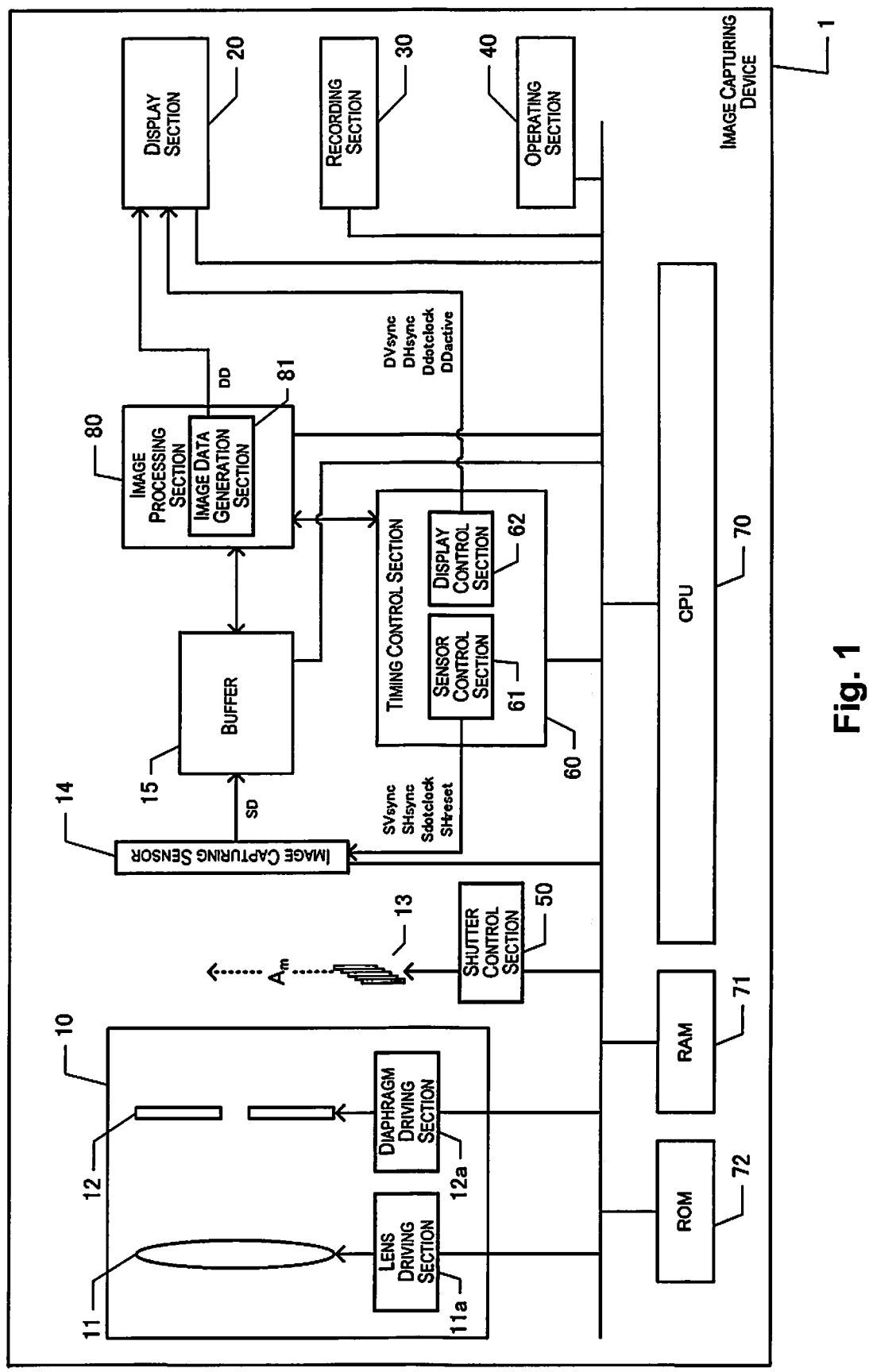
FIG. 1 is a block diagram showing a configuration of an image capturing device.

Hereinafter, embodiments of the present invention will be explained with reference to the attached drawings. The corresponding components in the respective drawings are given the same reference numerals and the overlapping explanations are omitted.

1. First Embodiment

1-1. Configuration of Image Capturing Device

FIG. 1 is a block diagram showing a configuration of an image capturing device 1 according to an embodiment of the present invention. The image capturing device 1 is a mirrorless digital camera provided with an EVF (Electronic View Finder). The image capturing device 1 according to the present embodiment has a lens unit 10, a shutter 13, a shutter control section 50, an image capturing sensor 14, a buffer 15, an image processing section 80, a timing control section 60, a display section 20, a recording section 30, an operating section 40, a CPU 70, a RAM 71, a ROM 72, and the like. The CPU 70 executes a program recorded in the ROM 72 by using the RAM 71 as appropriate. Through the function of the program, the CPU 70 generates image data that shows an object captured by the image capturing sensor 14 in response to an operation to the operating section 40, and implements the function to display on the display section 20 or record on a removable memory. A plurality of kinds of program diagrams for live view image capturing or actual image capturing are recorded in the ROM. The operating section 40 has a shutter button, a dial switch for changing charge storing time (shutter speed) or an aperture of a diaphragm 12, a switch for changing ISO sensitivity, and a switch for operating various kinds of setting menus.

The lens unit 10 has a lens 11, the diaphragm 12, a lens driving section 11a, a diaphragm driving section 12a, and the like. The lens unit 10 is attached to a case of the image capturing device 1 in a replaceable manner. The case is not shown in the drawing. The lens 11 is illustrated as a single lens in FIG. 1 for simplicity. However, the lens 11 includes a plurality of lenses arranged in an optical axis direction, and each lens is supported by an outer edge portion thereof. The lens driving section 11a adjusts a focus or a zoom magnification by moving at least one lens in the optical axis direction in response to a control signal output from the CPU 70. The diaphragm 12 is composed of a plurality of light shielding plates that can change the aperture. The diaphragm driving section 12a changes the aperture of the diaphragm 12 by driving the diaphragm 12 in response to a control signal output from the CPU 70.

The shutter 13 is a mechanical focal-plane type shutter, and is provided with a plurality of openable (folding) light shielding curtains as a light shielding section having a plane plate shape in parallel with an image capturing sensor plane of the image capturing sensor 14. The light shielding curtains are configured to move in a direction perpendicular to the optical axis in response to a control signal from the shutter control section 50. Normally, the light shielding curtains are retained without interrupting a light path in a direction in parallel with the optical axis. When a predetermined trigger is given in a state where the light shielding curtains are retained without interrupting a light path, the state where the light shielding curtains are retained without interrupting a light path is released, and the light shielding curtains are driven in the direction perpendicular to the optical axis so as to place a plurality of vanes thereof in a state of interrupting the light path. In FIG. 1, the moving direction of the light shielding curtains is shown by a dashed arrow Am.

The image capturing sensor 14 is a CMOS (Complementary Metal Oxide Semiconductor) image sensor provided with a color filter of a Bayer array and a plurality of photoelectric conversion elements (photo diodes) which store a charge corresponding to the amount of light in each pixel by photoelectric conversion. The image capturing sensor may be another sensor such as a CCD (Charge Coupled Device) image sensor. The positions of the pixels of the image capturing sensor 14 are defined in coordinates of a Cartesian coordinate system. A line is formed with a plurality of pixels arranged in a' direction parallel to one axis of coordinate, and a plurality of lines are arranged in a direction parallel to the other axis of coordinate. In the present specification, the direction parallel to the line is referred to as a horizontal direction, and the direction perpendicular to the line is referred to as a perpendicular direction. The image capturing sensor 14 is disposed such that the perpendicular direction is in parallel with the moving direction (Am) of the shutter 13.

In the image capturing sensor 14 of the present embodiment, it is possible to reset (discharge) charges stored in the photoelectric conversion elements per line. Specifically, charges are reset at the same time with respect to each other in the plurality of photoelectric conversion elements that belong to the same line, and charge storing is started at the same time with respect to each other immediately after the reset is released. The image capturing sensor 14 reads out the charges stored in the photoelectric conversion elements per line. The image capturing sensor 14 can conduct partial readout by reading out "M" lines per "N" lines ("N" and "M" are natural numbers that satisfy N>M) corresponding to a required image quality or speed instead of reading out all the lines. In the photoelectric conversion elements, charges are in a state of being reset even when the charges are read out.

In the image capturing sensor 14, the gain (corresponding to ISO sensitivity) with respect to a value of reading out the charge storing amount of a pixel can be adjusted in response to a control signal from the CPU 70. Specifically, it is possible to gradually change the degree of amplification of a signal that shows charges stored in the photoelectric conversion elements. The image capturing sensor 14 conducts A/D conversion to a tone value of an exposure amount corresponding to the charge that has been read out by an A/D convertor and the like, and generates 14-bit (at least 10-bit) output data that is associated with each pixel. The output data that has been read out from the image capturing sensor 14 is stored in the buffer 15, and various kinds of image processing is conducted to the output data by the image processing section 80 as described below.

The timing control section 60 has a sensor control section 61 and a display control section 62. The sensor control section 61 generates a signal for controlling various kinds of operation timings of each of the photoelectric conversion elements, and outputs it to the image capturing sensor 14. More specifically, the sensor control section 61 outputs a vertical synchronization signal (SVsync) that defines a period (vertical synchronization period) to read out detection results of the photoelectric conversion elements in one frame, a horizontal synchronization signal (SHsync) that defines a period (horizontal synchronization period) to read out detection results of the photoelectric conversion elements in one line, a data clock signal (SDotclock) that defines a timing and the like to read out image data of each pixel, and a reset signal (SHreset) that defines a timing to discard charges of the photoelectric conversion elements in a corresponding line, for example. The image capturing sensor 14 starts outputting output data of one frame in response to the vertical synchronization signal SVsync, and sequentially reads out output data (SD) that shows detection results of the photoelectric conversion element corresponding to the pixel of the image capturing sensor 14 at a timing in response to the data clock signal SDotclock within a period defined by the horizontal synchronization signal SHsync. The image capturing sensor 14 discards charges of the photoelectric conversion elements in a designated line at a timing in response to the reset signal SHreset. The CPU 70 and the sensor control section 61 correspond to the "control unit".

The display control section 62 generates a signal for controlling display timings of various kinds of display pixels of the display section 20, and outputs it to the display section 20. The display section 20 is an EVF, which displays image data generated based on the output data of the image capturing sensor 14 as a live view (moving image), and displays a still image of an object that has been actually captured. The display section 20 has an interface circuit, a liquid crystal panel driver, a liquid crystal panel, an eye lens, and the like, which are not shown in the drawing. The liquid crystal panel driver outputs a signal for driving liquid crystal by applying a voltage to each sub-pixel to the liquid crystal panel. The liquid crystal panel driver is configured to output various kinds of signals for a display on the liquid crystal panel such as a vertical synchronization signal (DVsync) that defines a period to display one frame, a horizontal synchronization signal (DHsync) that defines a period to display one line, a data active signal (DDactive) that defines a period to take in image data in each line, a dot clock signal (DDotclock) that defines a timing and the like to take in image data of each pixel, and image data (DD) of each pixel. The vertical synchronization signal DVsync, the horizontal synchronization signal DHsync, the data active signal DDactive, and the data clock signal (DDotclock) are generated by the display control section 62, and output to the display section 20.

In the present embodiment, the output timing of the horizontal synchronization signal DHsync is variable. As described below, after the display control section 62 acquires progress information showing that a next display target line is ready to be displayed from an image data generation section 81, the display control section 62 outputs the horizontal synchronization signal DHsync, and the display of the next display target line is started. It is sufficient for the progress information to be information that allows the display control section 62 to determine that image data of an $N^{th}$ line ("N" is a natural number) is ready to be displayed when the next display target line is the $N^{th}$ line, and various embodiments are possible. For example, the progress information may be a pulse signal that is output from the image data generation section 81 to the display control section 62 at a timing when processing of a resizing processing section of the image data generation section 81 is finished and image data of the $N^{th}$ line is generated. Alternatively, for example, the progress information may be a pulse signal that is output at a timing when generation of image data of the $N^{th}$ line is finished and writing of the image data of the $N^{th}$ line in the buffer 15 is finished. Alternatively, for example, the progress information may be a pulse signal that is output at a timing when generation of image data from the $N^{th}$ line to the $(N+i)^{th}$ line ("i" is a natural number), not only image data of the $N^{th}$ line, is finished and writing of the image data from the $N^{th}$ line to the $(N+i)^{th}$ line in the buffer 15 is finished. Alternatively, for example, the progress information does not need to be output as a pulse signal at the above-described timings, and may be information of another embodiment showing that image data has been forwarded to a predetermined buffer (for example, a value of a counter for counting the number of lines that have already been forwarded and the like). Alternatively, for example, a combination of a counter value and a pulse signal that is described next may be treated as the progress information. In such a case, the counter is, for example, a counter that shows the value of "N" by counting up at a timing when processing of the resizing processing section of the image data generation section 81 is finished and image data of the $N^{th}$ line is generated. Also, in such a case, the pulse signal is, for example, a pulse signal that is output to the display control section 62 to show that the counter value has been changed when the counter counts up at the above-described timing. The timing in the display control section 62 may be generated when the display control section 62 acquires a counter value showing a line in which generation of image data has been finished (showing to which line generation has been finished) and a pulse signal showing the timing when the counter has been renewed.

The present embodiment treats the pulse signal that is output at a timing when generation of image data of the $N^{th}$ line is finished and writing of the image data of the $N^{th}$ line in the buffer 15 is finished as the progress information.

The image processing section 80 is provided with the image data generation section 81. The image data generation section 81 conducts various kinds of image processing through pipeline processing with respect to the output data SD output from the image capturing sensor 14 by using a line buffer or a frame buffer that has been obtained in the buffer 15 beforehand. The image processing section 80 is an SOC that is constructed by an ASIC or a DSP, for example. The image data generation section 81 has a pixel interpolation section, a color reproduction processing section, a filter processing section, a gamma correction section, the resizing processing section, and an image data output section. The image data generation section 81 can generate the image data DD per line based on the output data SD of the image capturing sensor 14.

More specifically, the image data generation section 81 acquires the output data SD output by the image capturing sensor 14 from the line buffer of the buffer 15. The pixel interpolation section calculates a tone value of two channels of color different from the color of the color filter provided in the photoelectric conversion element corresponding to each pixel by conducting interpolation processing to a target pixel using a tone value of a peripheral pixel of the target pixel. As a result, data in which three channels of tone values are associated with each pixel is generated. The color reproduction processing section conducts color conversion processing for reproducing more correct color by conducting matrix operation of 3×3 to the tone value of each pixel of the data that has undergone the pixel interpolation. The filter processing section conducts filter processing such as sharpness adjustment or noise removal processing to the data that has undergone the color conversion processing. The gamma correction section conducts processing to correct tone characteristics at the time of outputting an image. Specifically, the gamma correction section conducts gamma correction to the data that has undergone the filter processing, and the gamma correction is for correcting color shown by the tone value of output data of the image capturing sensor 14 by a gamma function corresponding to color characteristics in the display section 20. The resizing processing section sequentially refers to the data that has undergone the gamma correction processing to be recorded in the line buffer of the buffer 15, and resizes it to a desired size in accordance with the record size of image data on the removable memory or the screen size of the display section 20. When resizing is finished in the resizing processing section, the image data DD that has undergone each image processing in the image processing section 80 can be generated.

The image data DD is temporarily stored in the buffer 15. In the case of a live view display, the image data generation section 81 notifies the display control section 62 of the above-described progress information at a timing when outputting the image data DD of one line to the buffer 15 is finished (although various embodiments of the progress information are possible as described above, the present embodiment treats the pulse signal that shows the timing when outputting the image data of one line of a next display target line to the buffer 15 is finished as the progress information). When the display control section 62 determines that the next display target line is ready to be displayed based on the progress information, the display control section 62 outputs the horizontal synchronization signal DHsync to the display section 20. The image data DD temporarily stored in the buffer 15 is delivered by the image data output section to the display section 20 sequentially per line, and displayed on the display section 20 at a timing defined by the horizontal synchronization signal DHsync. As a result, an image of an object captured by the image capturing sensor 14 is displayed on a liquid crystal panel of the display section 20. Also, the image data output section outputs OSD data recorded on a frame memory of the buffer 15 as the image data DD to the display section 20 sequentially per line for the display on the display section 20. As a result, letters such as image capturing conditions are displayed on the liquid crystal panel of the display section 20. In the case of actual image capturing, the image data DD generated and temporarily stored in the buffer 15 is delivered by the image data output section to the recording section 30, and recorded on the removable memory attached to the recording section 30.

Processing conducted by the image processing section 80 includes a process to output an evaluation value for AE (Automatic Exposure) processing and a process to output an evaluation value for AF (Automatic Focus) processing. Specifically, the image processing section 80 can specify an evaluation value (such as an average value of luminance) for evaluating the brightness of a pixel contained in a predetermined light measurement area set within an image capturing range of the image capturing sensor 14, and output it as an evaluation value for AE processing. The image processing section 80 can also specify an evaluation value (such as a value showing the magnitude of contrast) for evaluating the degree of focusing a pixel contained in a predetermined distance measurement area set within the image capturing range of the image capturing sensor 14, and output it as an evaluation value for AF processing. Further, the image processing section 80 has a processing section that achieves a common image processing function such as AWB (automatic white balance function) required by a digital camera.

In order to capture an image for the record by the image capturing device 1 according to the present embodiment (actual image capturing), the charge storing time is controlled by combining the shutter 13 as a mechanical shutter and an electronic shutter of the image capturing sensor 14. Specifically, in the case of actual image capturing in the present embodiment, exposure time is controlled by an electronic front curtain—mechanical rear curtain shutter method in which an exposure is started by the electronic shutter of the image capturing sensor 14 and ended by the light shielding curtain of the shutter 13. More specifically, in the case of actual image capturing, an exposure is started by the electronic shutter sequentially per line, and light shielding by the mechanical shutter is started so as to shield light each line at a timing when exposure time per line becomes a predetermined shutter speed (second). In the case of image capturing for a live view display, exposure time (that is, charge storing time) is controlled by an electronic shutter method. Specifically, both of the front curtain and the rear curtain are controlled by the electronic shutter.

A removable memory that is not shown in the drawing can be inserted into the recording section 30. Information can be recorded on the removable memory, and information can be read out from the removable memory in a state where the removable memory is inserted into the recording section 30. Image data generated by actual image capturing is recorded on the removable memory.

1-2. Image Capturing Processing

Figure 2:
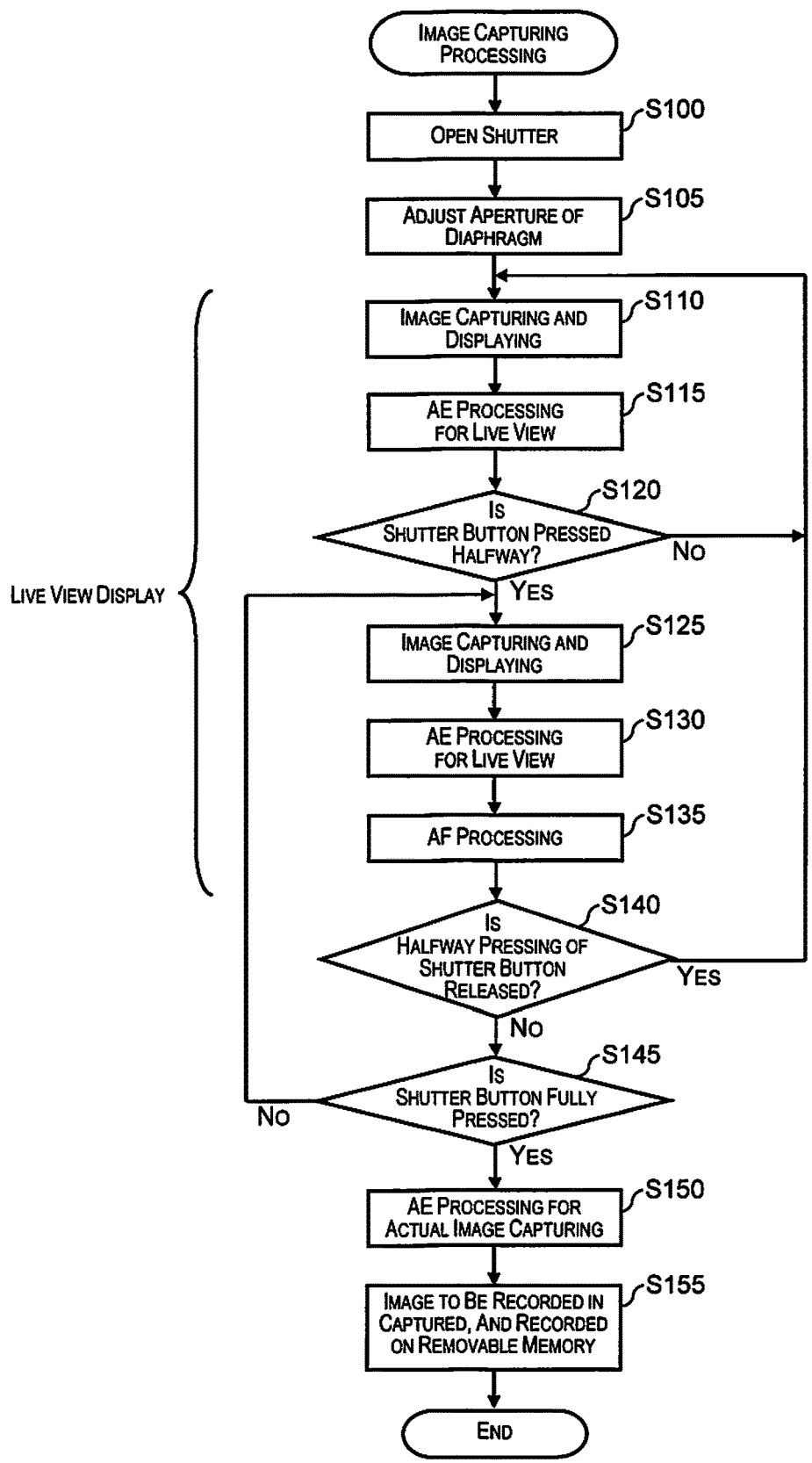
FIG. 2 is a flow chart showing image capturing processing.

Next, image capturing processing in the present embodiment will be described in detail. FIG. 2 is a flow chart of image capturing processing started when an image capturing mode is selected by a user after the power of the image capturing device 1 is turned on and an initializing process is finished. In the image capturing device 1, a live view of an object is displayed on the display section 20, and a user waits for a shutter chance while observing the live view display and issues an instruction to capture an image for the'record. The CPU 70 conducts preparation processing for the live view display in steps S100-S105 in the image capturing processing.

More specifically, the CPU 70 opens the shutter 13 (step S100). The CPU 70 outputs a control signal to the shutter control section 50, and places the shutter 13 in a state of being retained without interrupting the light path. The CPU 70 adjusts the diaphragm 12 to have a predetermined aperture (step S105). In the present embodiment, explanations will be made on the assumption that image capturing for a live view display or actual image capturing is conducted giving priority to the diaphragm. The CPU 70 may output a control signal to the diaphragm driving section 12*a*, and may control the aperture to correspond to a diaphragm value designated by a user's operation to the operating section 40, for example. The aperture may be controlled to correspond to a default diaphragm value that is determined with respect to each image capturing mode beforehand. Incidentally, control of the diaphragm 12 may be conducted before the shutter 13 is opened.

Figure 3A:
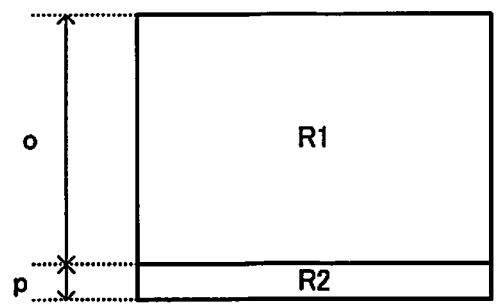
FIG. 3A is a diagram showing a display screen.

Next, the CPU 70 starts image capturing and displaying (step S110). FIG. 3A is a diagram showing a screen of the liquid crystal panel of the display section 20 according to the present embodiment. The display screen is constructed by an object image display region R1 and an information display region R2. The object image display region R1 is a region for displaying image data generated based on output data output from the image capturing sensor 14. The information display region R2 is a region for displaying information such as image capturing conditions with letters or figures. In FIG. 3A, "o" represents a height of the object image display region R1 (the number of lines), and "p" represents a height of the information display region R2 (the number of lines).

Figure 3B:
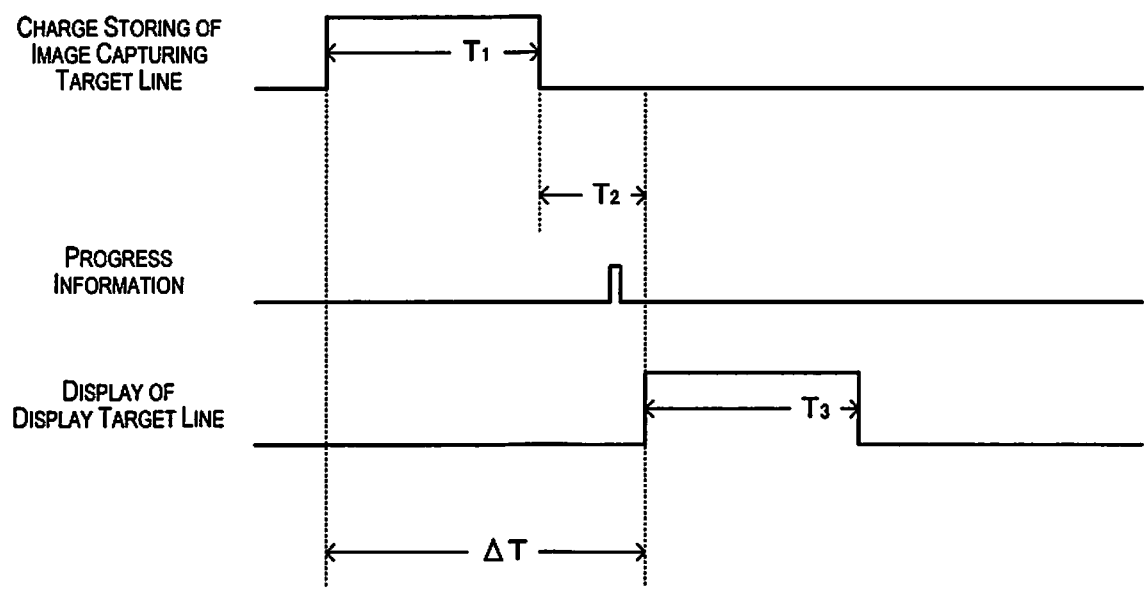
FIG. 3B is a timing chart for explaining a charge storing timing and a display timing.

FIG. 3B is a timing chart that simplifies a charge storing timing of an image capturing target line in the image capturing sensor 14 and a display timing of a display target line corresponding to the image capturing target line. Since the image output from the image capturing sensor 14 is resized into a size corresponding to the object image display region R1 in the resizing processing section, the image capturing target line and the display target line do not necessarily correspond to 1:1 (for example, image data of the display target line of one line can be generated from output data corresponding to a plurality of image capturing target lines). However, in the present embodiment, for simplicity, explanations will be made on the assumption that the image capturing target line and the display target line correspond to 1:1 (the image capturing target line that outputs data for generating image data of one line of the object image display region R1 (the number of the lines is "o") shown in FIG. 3A is one line).

In FIG. 3B, a first amount of time T1 represents charge storing time in an image capturing target line. A second amount of time T2 represents time from generation of the image data DD by the image data generation section 81 based on the output data SD of the image capturing target line until a start of a display of the generated image data DD in a display target line. Specifically, the second amount of time T2 includes time (A) of reading output data from the image capturing sensor 14, time (B) of generating image data based on output data, and time (C) of forwarding the generated image data to the display section 20 until a start of a display. When the image data generation section 81 finishes generating the image data DD and outputting it to the buffer 15, the image data generation section 81 outputs the progress information to the display control section 62, and the display control section 62 starts a display of the image data DD of a display target line corresponding to the progress information. A third amount of time T3 refers to time from a start of a display of the display target line in the current frame until a renewal of the display of the display target line in the next frame, and corresponds to the vertical synchronization period per frame shown by the frame rate of the display section 20. In other words, the length of the third amount of time T3 is equal to the length of a period from output of a horizontal synchronization signal (DHsync) that defines a start of a period (horizontal synchronization period) to display image data of the display target line until output of a horizontal synchronization signal (DHsync) that defines a start of a period (horizontal synchronization period) to display image data of the display target line in the next frame.

In the present embodiment, the total time of the first amount of time T1 and the second amount of time T2 is referred to as display delay time. Since the time (B) is variable with respect to each line, the second amount of time is also variable. However, since the maximum value of the time (B) can be known at the design stage, the maximum value of the second amount of time can also be known. In the present embodiment, the maximum value of the second amount of time is treated as the second amount of time T2. Also, in the present embodiment, the charge storing time in each image capturing target line is controlled to be the first amount of time T1≤(the vertical synchronization period—the second amount of time T2). The timing control section 60 controls the frame rate of the display section 20 to be equal to the frame rate of the image capturing sensor 14. As described above, since the time (B) is variable with respect to each line, the length of the horizontal synchronization period of the object image display region R1 is variable. By adjusting the length of the horizontal synchronization period of each line of the information display region R2 (for example, by making the horizontal synchronization period of the information display region R2 shorter than the horizontal synchronization period of each line of the object image display region R1 when the horizontal synchronization period of the object image display region R1 is relatively late) and displaying, the frame rate of the display section 20 can be synchronized with the frame rate of the image capturing sensor 14 (the length of the vertical synchronization period of the display section 20 can be made equal to the length of the vertical synchronization period of the image capturing sensor 14). OSD data displayed in the information display region R2 can be generated beforehand and recorded on the buffer 15 irrespective of operation of the image capturing sensor 14. Therefore, even if a display based on the OSD data is conducted with the short horizontal synchronization period, an appropriate display can be conducted without causing overtaking in reading out of data.

In the present embodiment, the frame rate of the image capturing sensor 14 in a live view is driven at 100 fps. The following explanations will be made on the assumption that the frame rate of the display section 20 is also driven at 100 fps because the display section 20 is controlled to be synchronized with the image capturing sensor 14. When the frame rate is 100 fps, the vertical synchronization period is 10 ms. The sensor control section 61 generates a vertical synchronization signal (SVsync) per 10 ms. Accordingly, when the maximum value of the second amount of time T2 is, for example, 3 ms, the first amount of time T1 is controlled to be equal to or less than 7 ms.

The CPU 70 conducts AE processing for a live view in conjunction with image capturing and displaying (step S115). Specifically, when the image processing section 80 outputs an evaluation value for conducting AE processing for a live view based on image data generated in step S110, the CPU 70 conducts feedback control of the charge storing time (T1) to achieve an appropriate exposure by outputting a control signal to the sensor control section 61 and adjusting the charge storing time (T1) such that the evaluation value is within an appropriate range determined in advance.

Figure 4:
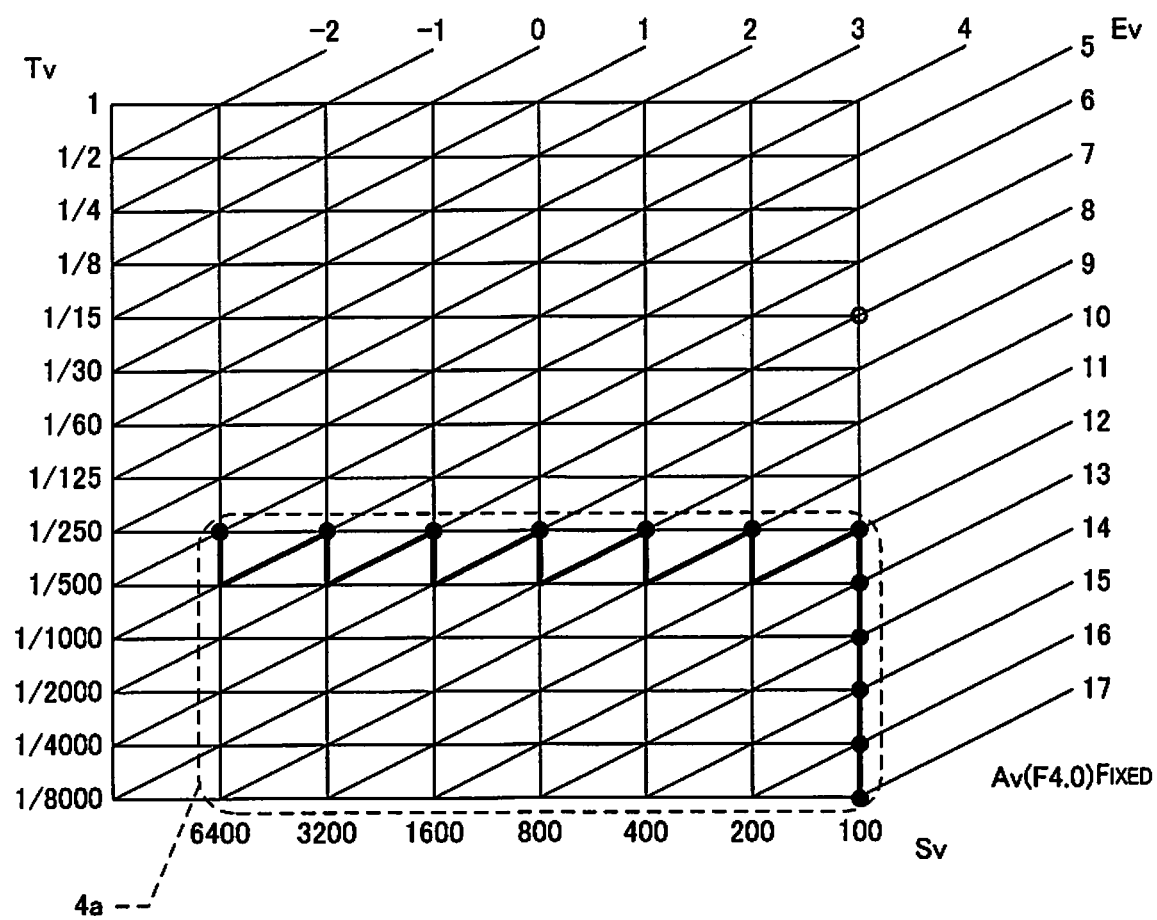
FIG. 4 is a program diagram according to a first embodiment.

FIG. 4 shows one example of a program diagram for automatic exposure (AE) control showing a combination of charge storing time (Tv) and ISO sensitivity (Sv) in a case where the diaphragm (Av) is fixed at F4.0 (as shown in FIG. 4, the image capturing device 1 can select 1-1/8000 as the charge storing time (Tv), and can select 100-6400 as the ISO sensitivity (Sv). Therefore, in a case where all combinations thereof can be selected, the image capturing device 1 can control the amount of the exposure to be 17EV to −2EV).

In the present embodiment, explanations will be made on the assumption that the aperture of the diaphragm 12 has been controlled to have a size corresponding to F4.0 (step S105). In a case where it is determined that the charge storing time, that is, the first amount of time T1 is equal to or less than 7 ms as described above, the combination of (Sv, Tv) corresponding to 42 (=6×7) intersection points within a region enclosed by a dashed line 4a of FIG. 4 can be selected, and the selectable range of the charge storing time is 1/8000-1/250. Also, the selectable range of the ISO sensitivity is 100-6400. AE processing becomes possible in a range of EV17-EV6 by changing the ISO sensitivity within 100-6400 and changing the charge storing time within 1/8000 s (approximately 0.125 ms)–1/250 s (approximately 4 ms).

However, since a combination in which the value of the ISO sensitivity is larger among a plurality of combinations that achieve the same EV value deteriorates the image quality, the present embodiment uses a program diagram (a thick line in FIG. 4) that selects a combination in which the value of the ISO sensitivity is as small as possible among a plurality of combinations that achieve the same EV value within the dashed line 4*a*. The thick line shown in FIG. 4 is set such that points shown by black circles on the thick line are combinations in which the ISO sensitivity is as small as possible among combinations that achieve EV17-EV6.

In FIG. 4, the charge storing time (Tv) is shown by 1, ½, ¼, ⅛, 1/15, 1/30 . . . 1/8000. Strictly, however, the number of seconds shown by $1/2^n$ (0≤n≤13) is used as the charge storing time. For example, 1/250 means 1/256 s (approximately 3.9 ms) in a strict sense, and 1/500 means 1/512 s (approximately 1.95 ms) in a strict sense.

Here, for example, when the luminance value as the evaluation value output from the image processing section 80 shows an underexposure of 1 EV with respect to the target luminance value to achieve an appropriate exposure in a case where the combination of (Sv, Tv) is (800, 1/250), the CPU 70 controls the combination of (Sv, Tv) to be (1600, 1/250). That is, the ISO sensitivity (gain) is increased from the state of (800, 1/250). With this, image capturing can be conducted with an appropriate exposure in a state where the charge storing time is maintained to be equal to or less than 1/250 s.

When it turns out that EV8 is an appropriate exposure in a case of making selections from the 42 combinations contained in the dashed line 4*a*, the combination of 6400 as the upper limit of the ISO sensitivity in the image capturing device 1 and 1/1000 s as the charge storing time can be selected. In such a case, "the shortest charge storing time that achieves an appropriate exposure when the gain is increased to an upper limit" is 1/1000. The explanations will go back to the flow chart of FIG. 2.

Next, the CPU 70 determines whether the shutter button is pressed halfway or not (step S120), and repeats the processing of step S110 to step S115 until it is determined that the shutter button is pressed halfway. On the other hand, when it is determined that the shutter button is pressed halfway in step S120, the CPU 70 prepares for actual image capturing in step S125 to step S135. Here, since step S125 to step S130 are the same processing as step S110 to step S115, explanations thereof are omitted.

In AF processing of step S135, when the image processing section 80 outputs an evaluation value for conducting AF processing based on image data generated in step S125, the CPU 70 acquires the evaluation value. Then, the CPU 70 outputs a control signal to the lens driving section 11*a* based on the evaluation value, and conducts focus adjustment by moving the lens 11 so that the evaluation value is in a predetermined focusing range.

Next, the CPU 70 determines whether the halfway pressing of the shutter button is released or not (step S140). When it is determined that the halfway pressing of the shutter button is released, the CPU 70 conducts the processing of step S110 and the subsequent steps again so as to continue the live view display. On the other hand, when it is not determined that the halfway pressing of the shutter button is released, the CPU 70 further determines whether the shutter button is fully pressed or not (step S145). When it is not determined that the shutter button is fully pressed, the processing of step S125 and the subsequent steps are repeated.

Figure 5:
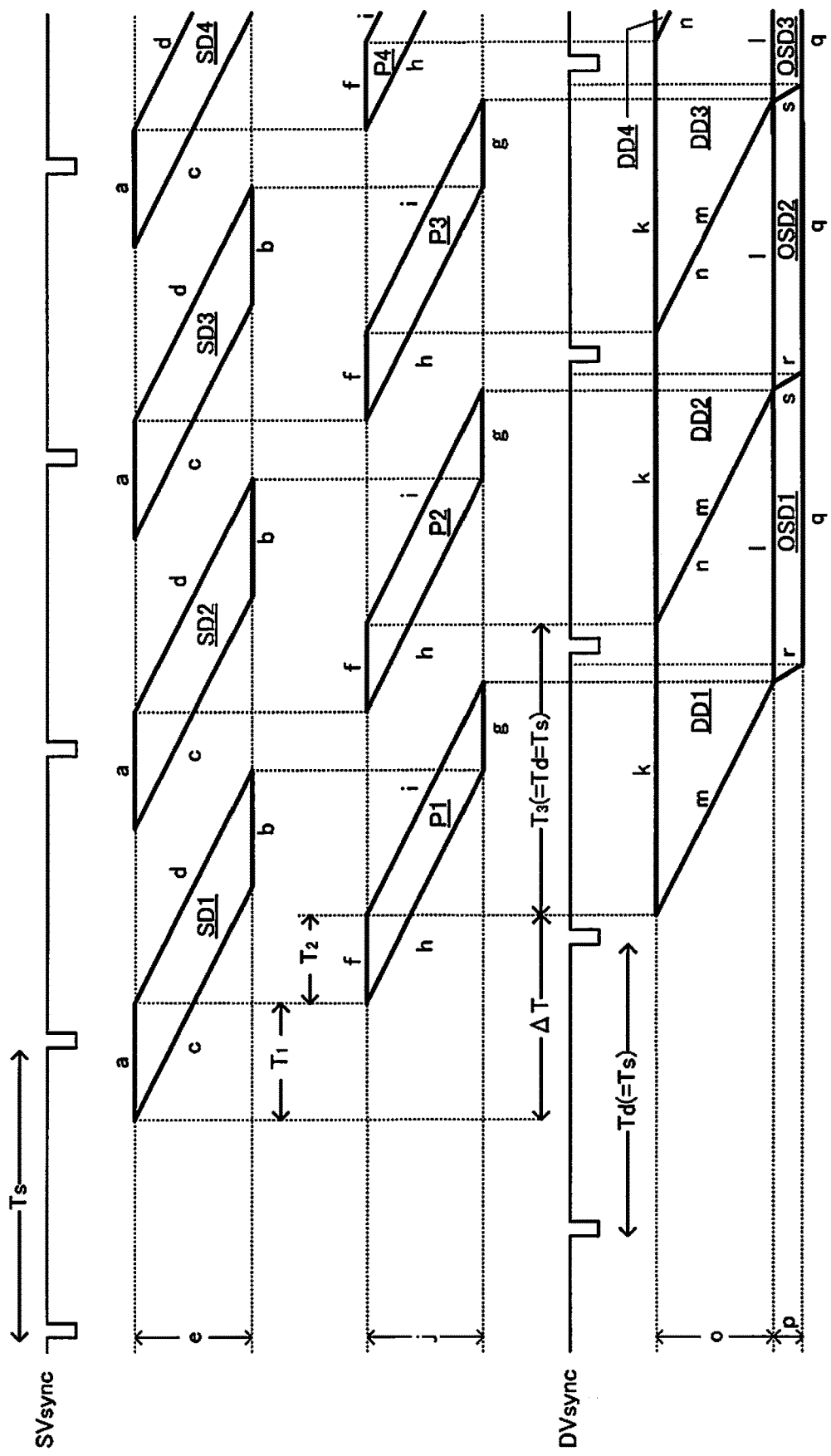
FIG. 5 is a timing chart showing image capturing and a display for a live view.

While steps S110-S135 are repeated, therefore, a live view is displayed on the display section 20. FIG. 5 is a timing chart showing a charge storing timing (SD1-SD4) by the image capturing sensor 14, a processing timing (P1-P4) by the image data generation section 81 and the like, and a display timing (DD1-DD4) by the display section 20 for a live view display. In FIG. 5, parallelograms assigned with identifiers of SD1-SD4 show the charge storing timing in each line from the first frame to the fourth frame, respectively. An upper side "a" of each parallelogram shows the charge storing time (=the first amount of time T1) of a top line among effective lines (lines that output data for generating image data to be displayed in the object image display region R1) of the image capturing sensor 14. A lower side "b" shows the charge storing time in a bottom line among the effective lines of the image capturing sensor 14. A height "e" shows the line number of the effective lines of the image capturing sensor 14. A line segment that is in parallel with the upper side "a" and the lower side "b" in which a left side "c" and a right side "d" are both ends thereof shows the charge storing time in each effective line of the image capturing sensor 14. The line segment is not shown in the drawing. The left side "c" shows a charge storing start timing in each effective line of the image capturing sensor 14. The right side "d" shows a charge storing end timing in each effective line of the image capturing sensor 14. Specifically, charge storing is started in a corresponding line by outputting a reset signal SHReset for the line to the image capturing sensor 14 at a timing shown by the intersection point between the left side "c" and the line segment of each line. The output data SD is read out from the photoelectric conversion element of a corresponding line at a timing shown by the intersection point between the right side "d" and the line segment of each line during the horizontal synchronization period defined by the horizontal synchronization signal SHsync that is not shown in the drawing.

A line segment that is in parallel with an upper side "f" and a lower side "g" of each of parallelograms assigned with identifiers of P1-P4 in which a left side "h" and a right side "i" of each parallelogram are both ends thereof shows processing time (that corresponds to the second amount of time T2 in FIG. 3B) from generation of the image data DD based on the output data SD of each line in which charge storing is finished at a timing shown by the right side "d" of SD1-SD4 until a start of a display on the display section 20. A height "j" shows the line number of processing. In the present embodiment, for simplicity of the explanation, the line number shown by the height "e", the line number of processing shown by the height "j", and a line number shown by a height "o" described below are the same.

Parallelograms assigned with identifiers of DD1-DD4 show the display timing of the object image display region R1 from the first frame to the fourth frame, respectively. OSD1-OSD3 show the display timing of the information display region R2 from the first frame to the third frame, respectively. A height "o" as a distance from an upper side "k" to a lower side "l" shows a line number of the object image display region R1. A height "p" shows a line number of the information display region R2. The upper side "k" shows time to continue the display in the top line of the object image display region R1 (time from a start of a display in the current frame until rewriting with new image data in the next frame). A left side "m" shows a display start timing, and a right side "n" shows a display end timing. The display end timing "n" in the current frame coincides with the display start timing "m" in the next frame. The left side "m" coincides with the timing of the right side "i" of P1-P4.

The lower side "l" shows time to continue the display in the bottom line of the object image display region R1. A line segment that is in parallel with the upper side "k" and the lower side "l" in which the left side "m" and the right side "n" are both ends thereof shows the display continuance time in each line of the object image display region R1.

In OSD1-OSD3, a left side "r" shows a display start timing, and a right side "s" shows a display end timing. The slope of the left side "r" and the right side "s" is sharper than that of the left side "m" and the right side "n" in DD1-DD4. This means that the interval to generate a horizontal synchronization signal DHsync for displaying the information display region R2 is shorter than the interval to generate a horizontal synchronization signal DHsync for displaying the object image display region R1, and the display of the information display region R2 is at a higher speed than the display of the object image display region R1. In this manner, the images of the object image display region R1 and the information display region R2 can be renewed within one vertical synchronization period Td.

As described above, according to the present embodiment, in image capturing for a live view display, the charge storing time is controlled such that the display delay time $\Delta T$ shown by the charge storing time (the first amount of time T1)+the processing time (the second amount of time T2) is equal to or less than the vertical synchronization period Ts (=Td), and thus the display delay time can be reduced intentionally. Since the timing to read out the stored charge (the right side "d" of SDn) is determined based on the vertical synchronization period Ts defined by the vertical synchronization signal SVsync, the length of the charge storing time (the upper side "a" of SDn) is adjusted by changing the position of the timing to start charge storing (the left side "c" of SDn) in a time axis direction. Incidentally, the display delay time $\Delta T$ can be measured by a method disclosed in Japanese Patent Application No. 2012-226674, Japanese Patent Application No. 2012-226675, and Japanese Patent Application No. 2012-226676. Also, the time shown by $(\Delta T+T3)=(T1+T2+T3)$ can be measured by the above-described method. According to the investigation made by the inventors of the present invention, it turned out that a practical range to make it difficult for an observer to subjectively perceive a delay in a live view display is at least $(T1+T2+T3) \geq 33.3$ ms, and the range is preferably $(T1+T2+T3) \leq 20$ to 25 ms. In the case of the present embodiment, $(T1+T2+T3)$ is approximately 4 ms+3 ms+10 ms=approximately 17 ms, and good results can be obtained. Also, the inventors confirmed that the value of the first amount of time T1 should be equal to or less than 8 ms and should be as small as possible. When the first amount of time T1 is set to be approximately 16 ms in a case where the vertical synchronization period is 60 fps, a blur occurs as well as a delay. 16 ms corresponds to a shutter speed of 1/60, and corresponds to a speed in which an image capturing blur easily occurs with respect to a moving object. 8 ms corresponds to a shutter speed of 1/125, and corresponds to a speed in which an image capturing blur does not easily occur. It can be said that 4 ms (that corresponds to a shutter speed of 1/250) that is further shorter than 8 ms is a shutter speed that achieves image capturing with a fewer object blur. Accordingly, when the first amount of time T1 is set to be equal to or less than 8 ms, it is possible to conduct image capturing in which no object blur occurs and a display delay is small.

The inventors confirmed that the image capturing device 1 of the present embodiment using a method in which a line determined by progress information to be ready for a display of image data is sequentially displayed on the display section 20 can achieve 6 ms (±4 ms) as $\Delta T$ (=T1+T2). The inventors also confirmed that the image capturing device 1 can achieve 16 ms (±4 ms) as $(\Delta T+T3)=(T1+T2+T3)$.

The explanations will go back to the flow chart of FIG. 2.

When it is determined that the shutter button is fully pressed in step S145, the CPU 70 determines charge storing time for actual image capturing (for image capturing of an image to be recorded. Regarding the pixel number for actual image capturing, an image is captured with higher resolution (such as 18000000 pixels) compared to a live view) by conducting AE processing for actual image capturing (step S150). An image to be recorded is captured with the determined charge storing time, and recorded on the removable memory (step S155). Specifically, the CPU 70 outputs a control signal to the sensor control section 61 so as to start charge storing sequentially per line in the image capturing sensor 14, outputs a control signal to the shutter control section 50, and drives the shutter 13 at a timing that allows the charge storing time of each line of the image capturing sensor 14 to be time determined by step S150 in a state where the position of the focus and the aperture of the diaphragm 12 set in step S105 are maintained. As a result, the image processing section 80 generates image data while using the buffer 15 based on the output data output from the image capturing sensor 14. The CPU 70 forwards the generated image data to the recording section 30, and the data is recorded on the removable memory that is not shown in the drawing. When the image capturing is ended, it goes back to step S100 for next image capturing.

In AE processing for actual image capturing of step S150, a program diagram different from FIG. 4 is used. In the present embodiment, the AE processing for actual image capturing is conducted in a state where the diaphragm is fixed at 4.0, for example (it is called diaphragm priority automatic exposure processing). Regarding the ISO sensitivity, a value set by a user beforehand (or a default value corresponding to the kind of an image capturing mode) is selected. In the AE processing for actual image capturing, therefore, the charge storing time can be selected between 1/8000 s–1 s corresponding to the image capturing environment. In step S150, the charge storing time is selected to achieve an EV value that is determined to be an appropriate exposure in the last step S130 (immediately before the shutter button is fully pressed) among the repeated step S130 in which the AE processing for a live view was conducted. For example, when the value of the ISO sensitivity set by a user (or a default value corresponding to the kind of an image capturing mode) is 100 and it turned out that the appropriate exposure is EV8, since the AE processing is conducted in a state where the diaphragm is fixed at 4.0 in the present embodiment, 1/15 s is selected as the charge storing time for actual image capturing (see the white circle in FIG. 4).

Specifically, when an image for the record is captured in the same image capturing environment, 1/15 s is selected as the charge storing time. When image capturing for a live view display is conducted, 1/250 s that is higher-speed (shorter) time than 1/15 s is selected as the charge storing time. Accordingly, in the image capturing device 1, the display delay time is reduced in a live view display by conducting image capturing for a live view display with such short charge storing time that is not selected when an image for the record is captured in the same image capturing environment.

2. Other Embodiments

The technical scope of the present invention is not limited to the above-described embodiment. It is apparent that various changes and modifications can be made without substantially departing from the subject matter of the present invention. For example, a live view mode selecting switch may be provided to allow a user to select a first mode that prioritizes reduction in the display delay time over image quality of an image displayed on the display section based on image data or a second mode that prioritizes image quality of an image over reduction in the display delay time. When the first mode is selected, charge storing in an image capturing target line may be started such that the first amount of time is equal to or less than the vertical synchronization period minus the second amount of time as described in the first embodiment. When the second mode is selected, it may be possible to prioritize the ISO sensitivity set by a user (or a default), and conduct AE processing by changing the diaphragm or the charge storing time as appropriate.

In the above-described embodiment, the charge storing time is selected such that the first amount of time is selected to be equal to or less than the vertical synchronization period minus the second amount of time both before the shutter button is pressed halfway and in a state of being pressed halfway. However, before the shutter button is pressed halfway, it may be possible to conduct processing similar to the above-described second mode that prioritizes the image quality. In the state of being pressed halfway, it may be possible to conduct processing similar to the above-described first mode that prioritizes reduction in the display delay time. Specifically, since it is considered that the state where the shutter button is pressed halfway is a state where a user waits for a shutter chance, a live view is presented with a smaller delay with respect to movement of an object in the state where the shutter button is pressed halfway. As a result, a user can observe subtle movement of an object in the state where the shutter button is pressed halfway, and the user can capture an image of the object at an appropriate timing without missing a shutter chance.

Figure 6A:
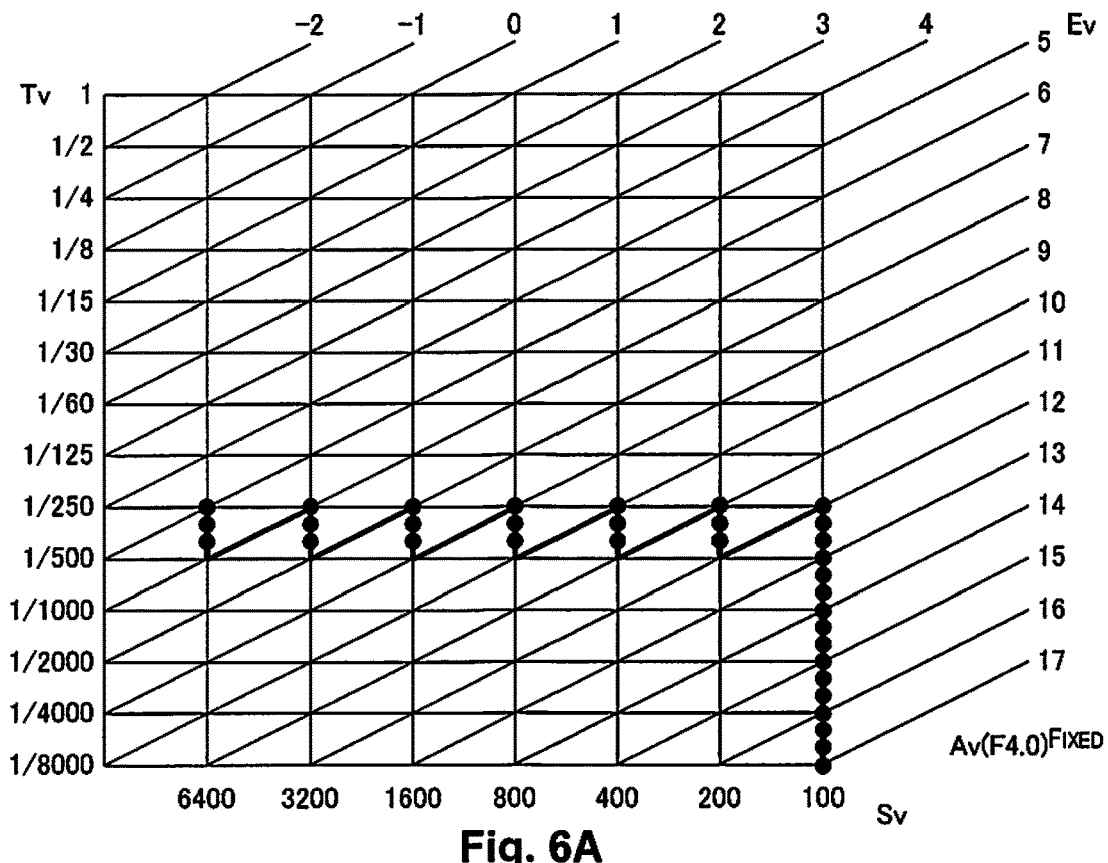
FIG. 6A and FIG. 6B are program diagrams according to another embodiment.
Figure 6B:
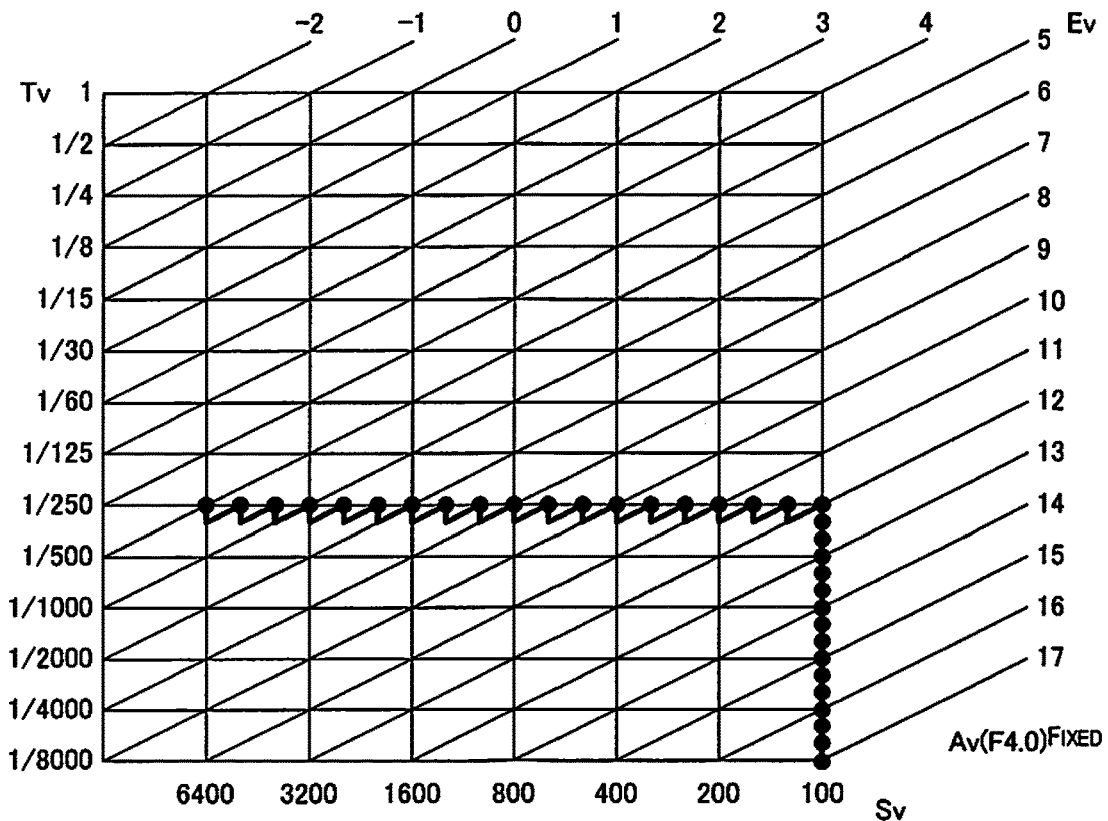
Figure 7:
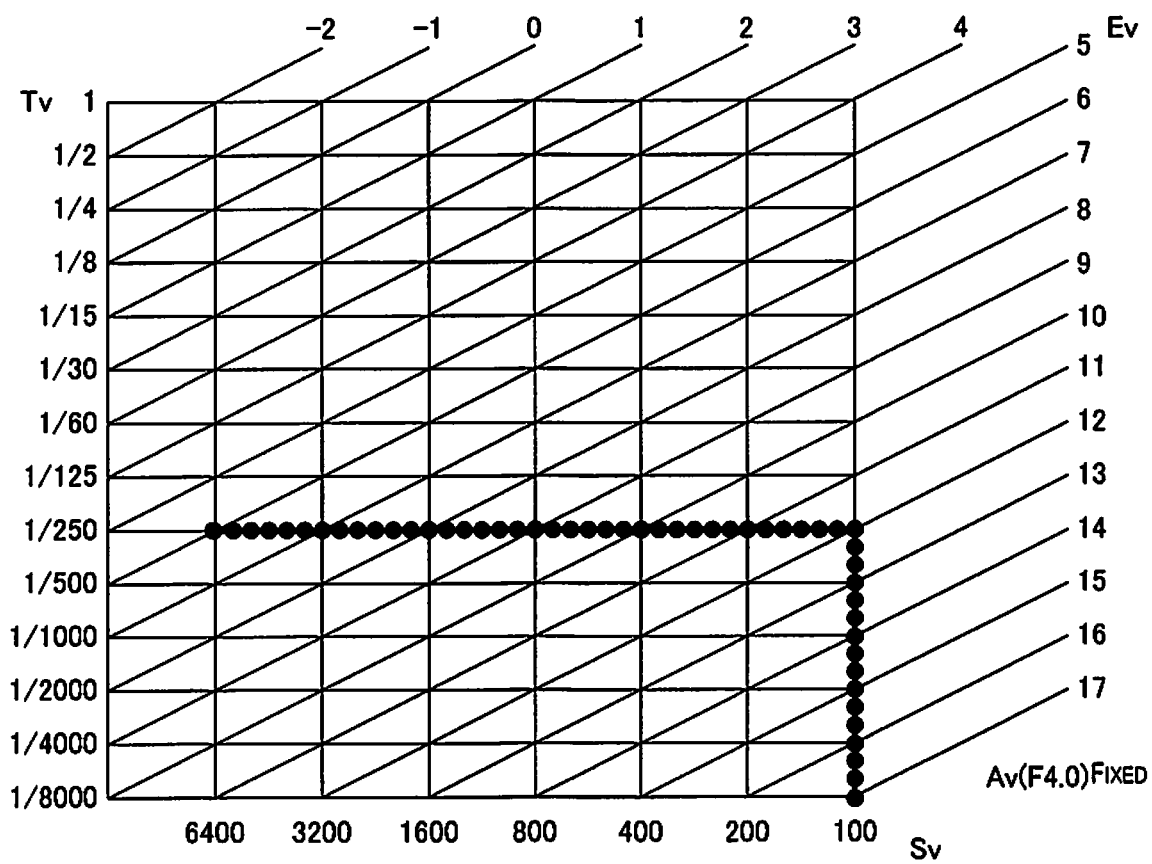
FIG. 7 is a program diagram according to another embodiment.

In the program diagram of FIG. 4, an exposure can be controlled with 1 EV increments. However, it may be possible that an exposure can be controlled with ⅓ EV increments by changing the charge storing time with ⅓ EV increments. FIG. 6A shows an example of a program diagram in a case where the charge storing time (Tv) can be changed with ⅓ EV increments. It may be possible that the ISO sensitivity (Sv) can also be changed with ⅓ EV increments. FIG. 6B shows an example of a program diagram in a case where both of the charge storing time (Tv) and the ISO sensitivity (Sv) can be controlled with ⅓ EV increments. By conducting control with ⅓ EV increments, an exposure in a live view display can be switched smoothly. Incidentally, when the charge storing time (Tv), for example, from 1/250 to 1/500 is controlled with ⅓ EV increments, the control is conducted with increments of 1/256, 1/322.5, 1/406.4, and 1/512. Also, when the ISO sensitivity (Sv), for example, from 100 to 200 is controlled with ⅓ EV increments, the control is conducted with increments of 100, 126, 159 and 200. It may also be possible that the ISO sensitivity (Sv) can be controlled with smaller increments than ⅓ EV. FIG. 7 shows an example of a program diagram in a case where the charge storing time (Tv) can be controlled in EV 17 to EV 12 with ⅓ EV increments, and the ISO sensitivity (Sv) can be controlled in EV 12 to EV 6 with smaller increments than ⅓ EV.

In the program diagrams shown in FIG. 4, FIG. 6, and FIG. 7, AE processing can be conducted within a range of EV 17 to EV 6 while the diaphragm 12 is fixed. However, by changing the diaphragm value from F4.0 to F2.8-F2.0 while (Sv, Tv) is fixed, for example, at (6400, 1/250), EV 5 and EV 4 can be included in the control range of the AE processing.

Figure 8A:
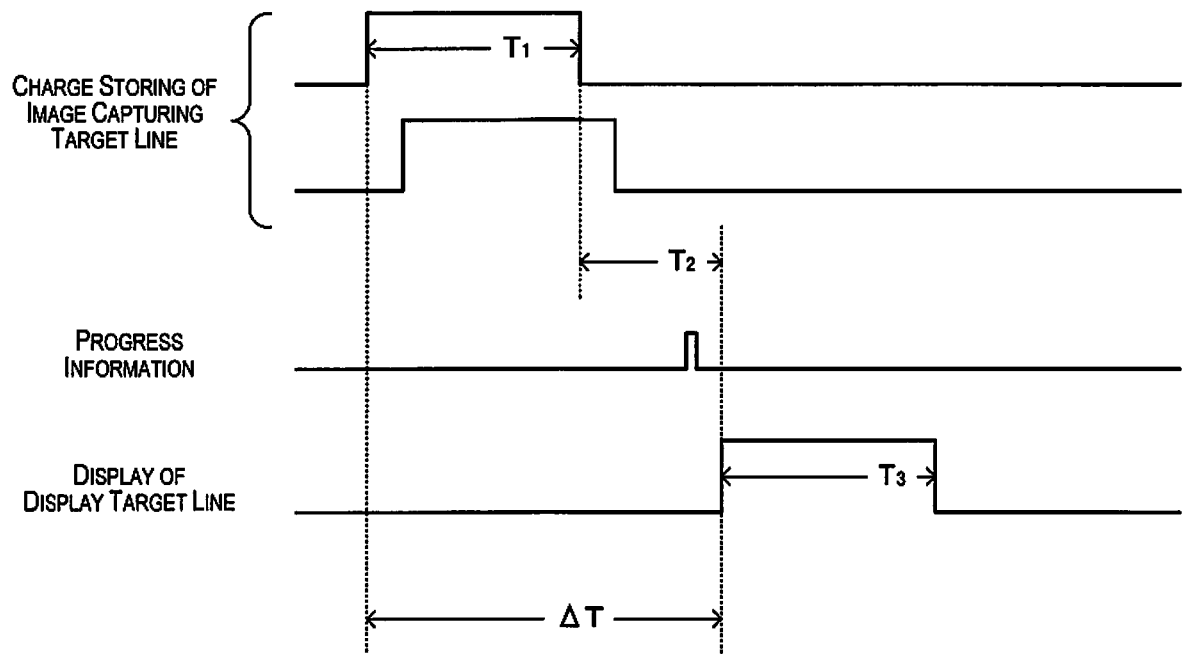
FIG. 8A and FIG. 8B are timing charts according to another embodiment.

In the first embodiment, the explanations were made on the assumption that the image capturing target line and the display target line correspond to 1:1. However, in a case where image data of one line of the display section 20 is generated based on output data of "z" lines ("z" is a natural number equal to or more than 2) of the image capturing sensor 14, for example, the average of the charge storing time in each line included in the "z" lines of the image capturing sensor 14 may be used as the "first amount of time" (since the charge storing time in each line is the same, the average of the charge storing time in each line is equal to the charge storing time in each line). In such a case, as the "second amount of time", it may be possible to use time from an end of charge storing in the first line among the "z" lines of the image capturing sensor 14 until generation of image data of one line from output data of the "z" lines after an end of charge storing in the $z^{th}$ line and a start of displaying image data of one line of the display section 20 that corresponds to the "z" lines of the image capturing sensor 14. FIG. 8A shows the first amount of time T1, the second amount of time T2, and the display delay time ΔT in this case (In FIG. 8A, "z" is 2).

Figure 8B:
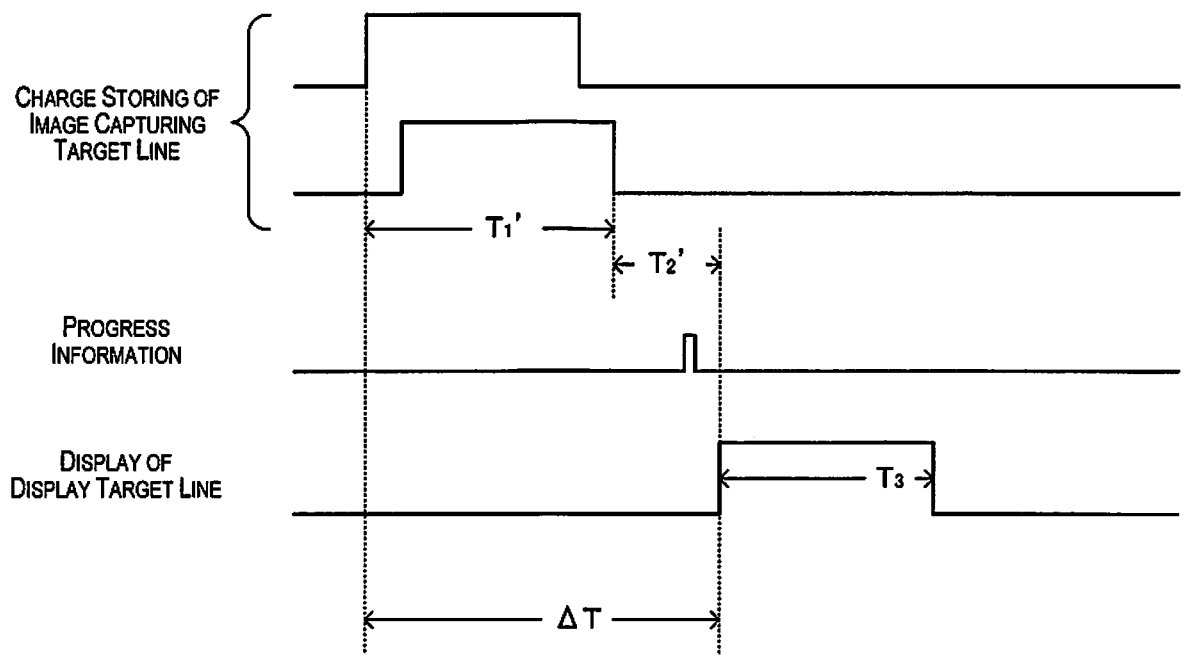

Also, for example, as the "first amount of time", it may be possible to use time from a start of charge storing in the first line among the "z" lines of the image capturing sensor 14 until an end of charge storing in the $z^{th}$ line among the "z" lines. In such a case, as the "second amount of time", it may be possible to use time from an end of charge storing in the $z^{th}$ line among the "z" lines of the image capturing sensor 14 until a start of displaying image data of one line of the display section 20 that corresponds to the "z" lines of the image capturing sensor 14. FIG. 8B shows the first amount of time T1', the second amount of time T2', and the display delay time ΔT in this case (In FIG. 8B, "z" is 2).

Further, in the image capturing device according to the embodiment, the control unit can achieve an appropriate exposure by increasing a gain of the image capturing sensor in a case where an exposure is an underexposure compared to an appropriate exposure when the first amount of time is controlled to be equal to or less than the vertical synchronization period minus the second amount of time.

As a result, it is possible to display a live view with an appropriate exposure even in a case where the first amount of time (the charge storing time) is controlled intentionally to be short.

In the image capturing device according to the embodiment, the control unit can select an amount of time equal to or more than shortest charge storing time that achieves an appropriate exposure when the gain is increased to an upper limit as the first amount of time.

As described above, the exposure can be adjusted to be an appropriate exposure by increasing the gain of the image capturing sensor in a case where an exposure is an underexposure compared to an appropriate exposure when the first amount of time is controlled to be equal to or less than the vertical synchronization period minus the second amount of time. In image capturing for a live view display, an amount of time equal to or more than shortest charge storing time that achieves an appropriate exposure when the gain is increased to an upper limit and equal to or less than the vertical synchronization period minus the second amount of time can be selected as the first amount of time (the charge storing time).

Further, in the image capturing device according to the embodiment, the control unit can select charge storing time that meets the above-described conditions as the first amount of time based on a program diagram that defines a combination of control values to control an exposure in the image capturing device and at least defines a combination of the charge storing time as a control value and the gain as a control value. The above-described conditions refer to being equal to or more than the shortest charge storing time that achieves an appropriate exposure when the gain is increased to the upper limit and equal to or less than the vertical synchronization period minus the second amount of time.

Specifically, the control unit does not need to have a mechanism that conducts time adjustment for optional charge storing time. The display delay time can be reduced and the exposure can be controlled by selecting the charge storing time that meets the above-described conditions based on the program diagram that defines a combination of control values to control an exposure beforehand.

Further, in the image capturing device according to the embodiment, the control unit selects an amount of time less than shortest charge storing time that achieves an appropriate exposure when an image to be recorded is captured in the same image capturing environment as the first amount of time that is charge storing time in image capturing for a live view display.

Specifically, the image capturing device according to the embodiment reduces the display delay time in a live view display by conducting image capturing for a live view display with such short charge storing time that is not selected when an image to be recorded is captured in the same image capturing environment (environment in which the brightness of an object is the same).

Further, in the image capturing device according to the embodiment, an amount of time equal to or less than 8 ms can be selected as the first amount of time.

When the vertical synchronization period is 60 fps-120 fps, it is possible to obtain good results by selecting an amount of time equal to or less than 8 ms as the first amount of time.

Further, the image capturing device according to the embodiment may have a live view mode selecting unit that allows a user to select a first mode or a second mode. The first mode prioritizes reduction in the display delay time over image quality of an image displayed on the display section based on image data. The second mode prioritizes image quality of an image displayed on the display section based on image data over reduction in the display delay time. In such a case, when the first mode is selected, the control unit starts charge storing of an image capturing target line such that the first amount of time is equal to or less than the vertical synchronization period minus the second amount of time.

The needs of a user regarding a live view display can be met by allowing a user to select the first mode that prioritizes reduction in the display delay time over image quality of an image displayed on the display section or the second mode that prioritizes image quality of an image over reduction in the display delay time. Specifically, when the first mode is selected, the charge storing time and the gain are selected as described above. Although a noise component is increased and the image quality is deteriorated in a case of increasing the gain to achieve an appropriate exposure, the display delay time can be reduced, and thus the needs of a user who selected the first mode can be met. When the second mode is selected, it cannot be expected to reduce the display delay time to be less than the display delay time at the time of selecting the first mode because the charge storing time is not selected based on the above-described design concept. However, when the display delay time is not less than the display delay time at the time of selecting the first mode, the gain becomes a smaller value than that at the time of selecting the first mode in the same image capturing environment. Therefore, a noise component becomes smaller than that at the time of selecting the first mode, and the image quality is improved compared to the quality at the time of selecting the first mode. Consequently, the needs of a user who selected the second mode can be met.

Incidentally, in image capturing for a live view in a state where a shutter button is not pressed, for example, the charge storing time may be selected in the second mode that prioritizes the image quality. In image capturing for a live view in a state where a shutter button is pressed halfway, the charge storing time may be selected in the first mode that prioritizes reduction in the display delay time.

Further, the technique to satisfy the first amount of time≤(the vertical synchronization period—the second amount of time) in image capturing for a live view display according to the embodiment can be implemented as a program or a method. Also, the above-described device, program, or method can be implemented as a single device, or implemented by using a common part in a device having a complex function, and various kinds of embodiments are included.

An image capturing device according to the embodiment has an image data generation unit, a display control unit, and a control unit. The image data generation unit generates image data per line of a display section (per one line or per a plurality of lines) based on an output of an image capturing sensor in which a start and an end of charge storing are controlled per line. The display control unit causes the display section to display generated image data sequentially per line (per one line or per a plurality of lines). The control unit ends charge storing after a first amount of time passes since charge storing of an image capturing target line is started, and starts displaying image data of a display target line corresponding to the image capturing target line after a second amount of time passes since charge storing of an image capturing target line is ended. In such a case, the second amount of time refers to time required for starting displaying image data in a display target line after charge storing of an image capturing target line is ended. The second amount of time includes time for reading out output data from the image capturing sensor, image data generation processing time by the image data generation unit, and time from forwarding generated image data to the display section until starting a display. The control unit starts charge storing of an image capturing target line such that the first amount of time is equal to or less than a vertical synchronization period of the image capturing sensor minus the second amount of time.

In the image capturing device of this aspect, since the first amount of time, that is, charge storing time is controlled intentionally to be equal to or less than the vertical synchronization period minus the second amount of time, it is possible to reduce the time from a start of charge storing of an image capturing target line until a start of displaying image data of a display target line corresponding to the image capturing target line (display delay time=the first amount of time+the second amount of time). In a case where the charge storing time that achieves an appropriate exposure by AE processing has the same length as the vertical synchronization period, for example, the display delay time (the first amount of time+the second amount of time) is equal to the vertical synchronization period plus the second amount of time, and the display delay time is not shorter than the vertical synchronization period plus the second amount of time in a conventional design concept. According to the present invention, however, the display delay time (the first amount of time+the second amount of time) can be made shorter than the vertical synchronization period plus the second amount of time. This is because the first amount of time is controlled to be equal to or less than the vertical synchronization period minus the second amount of time.

Here, "the image capturing target line" of "the display target line corresponding to the image capturing target line" refers to a line of the image capturing sensor that outputs output data for generating image data of a display target line. The display target line corresponding to the image capturing target line may be one line or may be a plurality of lines.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image-displaying device comprising:
   an image capturing sensor that starts capturing an image in synchronization with a first vertical synchronization signal and outputs output data corresponding to the image in a first period;
   an image processor that processes the output data and outputs image data corresponding to the output data in a second period from the input of the output data; and
   a display that starts a display of a display image based on the image data in synchronization with a second vertical synchronization signal so that a total period of the first period and the second period is less than or equal to a second vertical synchronization period corresponding to the second synchronization signal.

2. The image-displaying device according to claim 1, wherein
   the total period of the first period and the second period is less than or equal to a first vertical synchronization period corresponding to the first synchronization signal.

3. The image-displaying device according to claim 1, further comprising
   a controller that controls a charge storing time of the image capturing sensor in accordance with a luminance value so that the total period of the first period and the second period is less than or equal to the second vertical synchronization period corresponding to the second synchronization signal.

4. The image-displaying device according to claim 1, further comprising
   a controller that controls an ISO sensitivity of the image capturing sensor in accordance with a luminance value so that the total period of the first period and the second period is less than or equal to the second vertical synchronization period corresponding to the second synchronization signal.

5. The image-displaying device according to claim 1, further comprising
   a controller that controls a combination of a charge storing time of the image capturing sensor and an ISO sensitivity of the image capturing sensor in accordance with a luminance value so that the total period of the first period and the second period is less than or equal to the second vertical synchronization period corresponding to the second synchronization signal.

6. The image-displaying device according to claim 5, wherein
   the controller prioritizes the charge storing time of the image capturing sensor over the ISO sensitivity of the image capturing sensor.

7. The image-displaying device according to claim 1, further comprising
   a controller that controls a diaphragm value of the image capturing sensor in accordance with a luminance value so that the total period of the first period and the second period is less than or equal to the second vertical synchronization period corresponding to the second synchronization signal.

8. The image-displaying device according to claim 1, wherein
   the total period of the first period and the second period is 6±4 ms.

9. The image-displaying device according to claim 3, wherein
   the total period of the first period and the second period is 6±4 ms.

10. The image-displaying device according to claim 4, wherein
    the total period of the first period and the second period is 6±4 ms.

11. The image-displaying device according to claim 5, wherein
    the total period of the first period and the second period is 6±4 ms.

12. The image-displaying device according to claim 6, wherein
    the total period of the first period and the second period is 6±4 ms.

13. The image-displaying device according to claim 7, wherein the total period of the first period and the second period is 6±4 ms.

\* \* \* \* \*